Oct. 6, 1964     R. M. JAMES     3,151,415

PLANT FEEDING AND IRRIGATING DEVICE

Filed March 12, 1963

INVENTOR.
ROBERT M. JAMES
BY
Bean, Brooks, Buckley & Bean
ATTORNEYS

3,151,415
PLANT FEEDING AND IRRIGATING DEVICE
Robert M. James, 7 Cloister Court, Eggertsville, N.Y.
Filed Mar. 12, 1963, Ser. No. 264,638
3 Claims. (Cl. 47—48.5)

The present invention relates to an improved plant irrigating and feeding device and to an improved ram for inserting said device into the soil.

As is well known, a light rainfall will many times not be of benefit in irrigating a plant because it will run off from the surface of the soil without actually reaching the roots. In the past various devices have been proposed for conveying the rainfall to the roots of plants. These prior art devices consisted generally of a lower apertured portion which was located below the surface of the soil and an upper portion which received liquids, said upper portion being located above the surface of the soil. However these prior art devices had certain shortcomings which did not permit them to utilize small amounts of rainfall to maximum benefit. Certain of these prior art devices did not have a sufficiently large catch basin to catch an appreciable amount of a small rainfall. Other devices were not capable of retaining moisture after the rainfall ceased and therefore provided a small amount of moisture to the roots for a relatively short time and did not tend to conserve the rainfall for use over a relatively long period. Still other devices did not provide an arrangement for insuring that the liquid discharge openings of the plant irrigating and feeding devices remained open, that is, they readily became clogged by soil plugging such openings, and therefore could not feed collected precipitation to the roots. There were also devices which permitted the moisture which was intended to be fed to the roots of the plant to evaporate from the surface of the soil. Still other devices had no positive arrangement for preventing them from becoming loosened and therefore they became easily dislodged from the soil in which they were inserted. There were also other devices which prevented the surface soil in the vicinity of the device from being aerated and therefore not only caused grass to be destroyed but also allowed insects to collect. The present invention is concerned with the providing of an improved plant irrigating device and an improved ram for inserting it into the soil.

It is accordingly an object of the present invention to provide an improved plant feeding and irrigating device which is insertable into the soil in an extremely simple and expedient manner.

Another object of the present invention is to provide an improved plant irrigating and feeding device which is capable of discharging liquid into the soil surrounding the roots at a relatively controlled rate to thereby provide maximum utilization of small rainfalls.

A still further object of the present invention is to provide an improved plant irrigating and feeding device which is so constructed as to remain in firm engagement with the soil into which it is inserted thereby tending to obviate the possibility that it will become easily dislodged.

Yet another object of the present invention is to provide an improved plant feeding and irrigating device which prevents soil from entering the catch basin thereof and also tends to prevent soil from clogging the liquid discharge openings thereof thereby insuring unimpeded feeding of moisture to the roots of the plant with which the improved device is associated.

A still further object of the present invention is to provide an improved plant feeding and irrigating device which not only feeds liquid to the roots of plants but also maintains the moisture in the soil for a relatively long period of time, thereby providing an optimum benefit from such liquid feeding.

Another object of the present invention is to provide an improved ram which facilitates the insertion of the improved irrigating and feeding device into the soil in a simple and expedient manner. Other objects and attendant advantages of the present invention will readily be perceived hereafter.

The improved plant irrigating and feeding device of the present invention includes a body portion having a downwardly tapered lower end and a catch basin at its upper end. The catch basin is of relatively large cross sectional area with respect to the body portion and has an undersurface which is adapted to be located in contiguous relationship to the surface of the soil to thereby cast a shadow on the surface of the soil to thereby conserve moisture in the soil. The downwardly tapered portion has a plurality of apertures therein for discharging rainfall which is caught by the catch basin. The downwardly tapered portion has an apex at the lowermost portion thereof, and a reservoir, which is imperforate, is provided at the lowermost portion of the downwardly tapered portion between the apertures and the apex. This reservoir retains a supply of liquid which is not directly discharged through the apertures to thereby provide a source of liquid which is supplied to the earth by gradual evaporation after the directly discharged liquid has been absorbed. Associated with the improved plant irrigating and feeding device is a ram which permits the insertion of the feeding device into the ground in a simple and expedient manner, and, also incidental to such insertion, provides catchments which act as catch basins for receiving the moisture from the feeding device. The present invention will be more fully understood when the following portions of the specification are read in conjunction with the accompanying drawings wherein:

Figure 1:
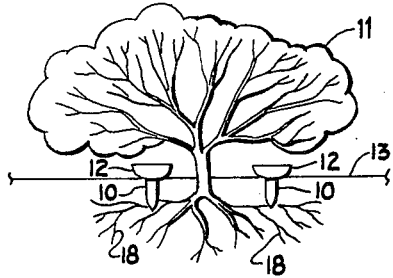
FIG. 1 is a schematic view showing the relationship of the improved plant irrigating and feeding devices of the present invention relative to a shrub.
Figure 3:
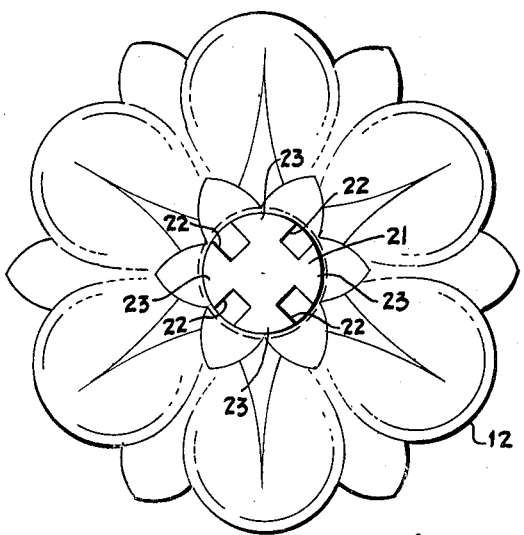
FIG. 3 is a plan view of the improved plant irrigating and feeding device of FIG. 2.

In FIG. 1, the plant irrigating and feeding devices 10 of the present invention is schematically shown relative to a plant 11. Whenever there is a rainfall the rain which drops from shub 11, as well as other rain which impinges directly on device 10, is caught by catch basin 12 which is located above the surface 13 of the soil. Catch basin 12, as can be seen from FIG. 3, is preferably in the shape of a floral design so that it blends harmoniusly with the surroundings in which it is located. A central body portion 14 of substantially cylindrical configuration is integrally formed with catch basin 12, and at the lower end of central body portion 14 is a tapered inverted substantially conical moisture discharging portion 15 which terminates at apex 16. A plurality of apertures 17 are located in conical portion 15 for discharging water into the soil adjacent roots 18.

Figure 2:
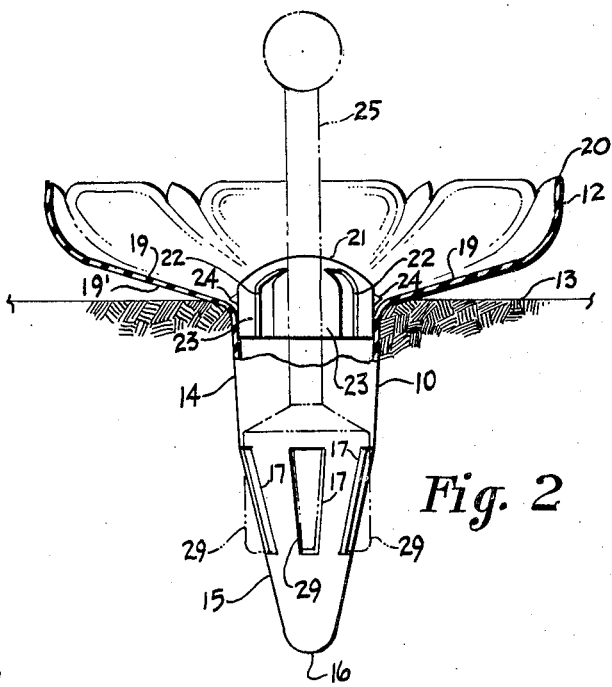
FIG. 2 is a side elevational view, partially in cross section, of the improved plant feeding and irrigating device of the present invention.

The improved plant feeding and irrigating device 10 is preferably made out of flexible plastic material and is formed as an integral unit. The central body portion 14, described above as being substantially cylindrical, possesses a slight draft (which is exaggerated in FIG. 2 for purposes of illustration) so that the upper portion is of slightly larger diameter than the lower portion. This draft facilitates manufacture, permits the improved irrigating devices to be nested, and also causes the upper portion to be in firm contact with the adjacent soil, as will become more apparent hereafter.

Whenever there is a rainfall, the catch basin 12 catches a maximum amount of this rainfall because of its relatively large cross sectional area. It is to be noted that the rainfall which is caught in the above manner flows downwardly from the catch basin, because of the sloping inner surfaces 19 thereof, into central body portion 14 and thence into inverted conical portion 15. A certain amount of the liquid will be discharged from apertures 17 into the adjacent soil to feed the roots 18 of the plant. It will also be noted that apertures 17 are located a substantial distance above apex 16. Therefore a certain amount of rainfall will be stored in the imperforate reservoir provided between the apex and the bottom portions of apertures 17 and this rainfall will tend to evaporate into the soil adjacent apertures 17 after the rainfall has ceased. In this manner rainfall is conserved and distributed to the roots of the plant over a relatively long period of time. It is also to be noted that because catch basin 12 is relatively large with respect to the central body portion 14, the present ratio being 4:1, it casts a relatively large shadow on the surface of the soil surrounding central body portion 14. This shadow tends to prevent the sun from beating down on the soil adjacent to said central body portion and thereby tends to prevent moisture in the soil from evaporating rapidly. Thus, in this respect also, the improved plant irrigating and feeding device tends to conserve moisture.

It is to be also noted that a small portion of the undersurface 19' of catch basin 12 comes into abutting relationship with the surface of soil 13 during the process of installation. Therefore this small portion of undersurface 19' provides a stop which postively locates the improved device 10 during the process of insertion thereof into the soil. Since catch basin 12 is able to cast a shadow on the soil surrounding central body portion 14 without contacting a substantial portion of the surface of the soil onto which a shadow is thrown, grass or the like, may grow on soil 13 because the surface of the soil is aerated, whereas if the entire portion of the surface of the soil on which a shadow were thrown were contacted by undersurface 19', such grass would die and a bare spot would be evident on the lawn when the device 10 was removed. Furthermore, since the undersurface 19' of the catch basin is elevated above the ground, there will be very little tendency for insects to collect under it and thereby minimize the possibility of such insects feeding on the roots of the plant.

It is to be also noted that the lip 20 of catch basin 12 is elevated a relatively large amount above the surface 13 of the soil. This prevents mud which is formed on the surface of the soil during a rainfall from flooding into catch basin 12. The fact that mud flooding is obviated tends to prevent apertures 17 from becoming clogged.

A strainer 21 (FIG. 2) is inserted into the top of central body portion 14. Strainer 21 has a plurality of apertures 22 therein which permit precipitation caught by catch basin 12 to flow into central body portion 14. Adjacent apertures 22, are flexible legs 23. Projections 24 are provided on strainer 21 to prevent it from moving beyond a predetermined amount in the central body portion 14. Strainer 21 prevents twigs, stones, and the like from dropping into the portions of improved device 10 and thereby prevents clogging of said device by such items.

It is to be noted that the length of central body portion 14 may be varied for different types of plants. Furthermore the apertures 17 may be located in different configurations depending on the requirements of different types of plants. It is to be also noted that apex 16 is rounded to thereby prevent injury to the roots of the plants during insertion of device 10. Because the improved irrigating and feeding device 10 is fabricated from plastic it will not be injurious to lawn mowers nor will it be injurious in any other manner to a person who might trip or fall thereon.

Figure 4:
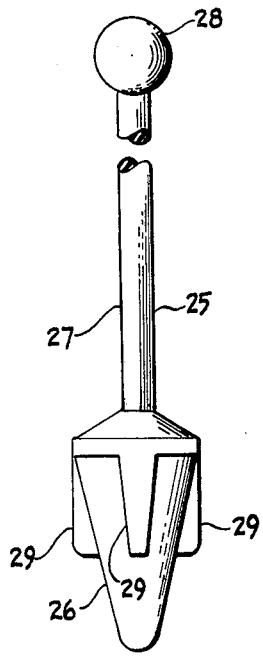
FIG. 4 is an elevational view of an improved ram which is utilized for inserting the plant feeding and irrigating device into the soil.

In accordance with another aspect of the present invention an improved ram 25 is provided for inserting the improved irrigating and feeding device 10 into the soil. Ram 25 includes an inverted substantially conical ram portion 26 which is adapted to fit in complementary mating relationship with the inverted conical portion 15 of device 10. Ram 25 may be fabricated from suitable metallic material or from a rigid plastic. Because of the above-described complementary mating relationship, ram portion 26 provides rigid support to conical portion 15 during the process of insertion thereof into the soil and thereby permits the latter to be made of soft plastic at a relatively low cost. The ram portion 26 is mounted on shank 27 which has a handle 28 mounted on the opposite end thereof from portion 26. Ram 25 is shown in FIG. 4 and is also shown in phantom in FIG. 2 in the position which it occupies during the insertion of device 10 into the soil. It will be appreciated that strainer 21 is removed during such process.

The inverted conical portion 26 of ram 25 has a plurality of lugs 29 extending outwardly therefrom. Lugs 29 perform a plurality of functions. First of all, they fit in close engagement through apertures 17 in portion 15 of device 10. This prevents soil from entering into said apertures during the process of inserting device 10 into the soil. Furthermore lugs 29 tend to compact the earth surrounding them after device 10 has reached its final position in the soil. This provides small catchments in the soil surrounding apertures 17 to enhance the flow of water from apertures 17 into the soil. Furthermore since the earth is compacted, its crumbling and entering through apertures 17 is prevented and thus clogging of said apertures by said soil is obviated. In addition, lugs 29 tend to break up the soil as ram 26 moves downwardly with device 10 thereon. This facilitates the insertion of device 10 into the soil. It is to be noted, however, that the outer diameter across lugs 29 is less than the outer diameter of central body portion 14. Therefore lugs 29 do not break up the soil which lies outwardly from central body portion 14 and such soil remains firmly compacted to retain central body portion 14 in firm engagement therein. This tends to prevent the wind and other factors from dislodging device 10 from the ground. Furthermore the slight draft of central body portion 14 further tends to enhance the firm engaging relationship between device 10 and the soil. In addition, because device 10 is flexible, the central body portion 14 can yield during insertion thereof so that firm contact will be maintained with the surrounding soil. After the improved irrigating and feeding device 10 has been inserted into the soil by the use of ram 25 in the above-described manner, it is withdrawn from said device.

It will be appreciated that while the portion 26 of ram 25 and portion 15 of device 10 have been shown of substantially conical configuration, they may also be fabricated of polygonal configuration without departing from the concepts presented above.

It can thus be seen that an improved plant irrigating and feeding device and an improved inserting ram therefor have been disclosed which are manifestly capable of achieving the above-enumerated objects of the present invention because they contain a plurality of uniquely integrated features, and while preferred embodiments of the present invention have been disclosed, it will be readily understood that the present invention is not limited thereto, but may be otherwise embodied within the scope of the following claims.

I claim:

1. In combination: a flexible plant irrigating and feeding device for insertion into the soil adjacent a plant, said device having a tapered soil penetrating end and a catch basin attached thereto by a central body portion, and a plurality of apertures in said soil penetrating end; a ram, a ram portion on said ram of complementary mating configuration with said soil penetrating end, a plurality of lugs on said ram portion of a configuration to extend through and beyond said apertures to loosen the soil surrounding said penetrating end during the insertion of said feeding device into the soil to thereby enhance the ease with which said feeding and irrigating device may be inserted into the soil, said lugs by extending through said apertures also compacting the soil adjacent said apertures after said device has been fully inserted into the soil to thereby provide catchments for moisture supplied to said soil penetrating end from said catch basin, said complementary mating relationship between said ram and said soil penetrating end maintaining the latter rigid during the process of insertion of said feeding device into the soil, a shank connected to said ram portion, and handle means mounted on said shank, said central body portion being of a dimension to permit withdrawal of said ram portion from said plant feeding and irrigating device after the latter has been inserted into the soil.

2. The combination as set forth in claim 1 wherein said lugs on said ram portion have a maximum outer diameter which approaches but is slightly smaller than the outer diameter of said central body portion, whereby said lugs loosen some of the soil surrounding said central body portion during insertion of said plant feeding and irrigating device into said soil but permit other portions of the soil surrounding said central body portion to remain firm to thereby maintain said central body portion in firm engagement with said soil after the removal of said ram.

3. A plant irrigating and feeding device for insertion into the soil adjacent a plant comprising a central body portion of substantially uniform cross-sectional configuration, a downwardly tapered portion located at one end of said central body portion, an apex located at the end of said downwardly tapered portion which is remote from said central body portion, a catch basin located at the other end of said central body portion, said catch basin being of relatively large cross-sectional area with respect to said central body portion and having an undersurface adapted to be located in contiguous relationship to the surface of said soil whereby said catch basin casts a substantial shadow on the surface of said soil to conserve moisture in said soil without contacting said soil and thereby permits said surface on which said shadow is cast to be aerated, a plurality of apertures in said downwardly tapered portion for discharging liquid caught by said catch basin and conducted thereto by said central body portion, each of said apertures being elongate and having a lower edge spaced above said apex of the downwardly tapered portion to define an imperforate reservoir located in the lowermost part of said downwardly tapered portion between said apex and said lower edge, said elongated dimension of each of said apertures extending axially of said downwardly tapered portion from such lower edge at least substantially through out the area of said downwardly tapered portion which lies between said lower edge and the juncture between said downwardly tapered portion and said central body portion.

References Cited in the file of this patent

UNITED STATES PATENTS

| | | |
|---|---|---|
| 612,745 | Morris | Oct. 18, 1898 |
| 718,380 | Patterson | Jan. 13, 1903 |
| 1,424,157 | Cook | Aug. 1, 1922 |

FOREIGN PATENTS

| | | |
|---|---|---|
| 202,146 | Germany | Sept. 26, 1908 |